United States Patent
Voiculescu

[19]

[11] Patent Number: 5,855,128
[45] Date of Patent: Jan. 5, 1999

[54] STEERING WHEEL PROTECTION DEVICE

[75] Inventor: Danut Voiculescu, North Olmsted, Ohio

[73] Assignee: Winner International Royalty Corporation, Sharon, Pa.

[21] Appl. No.: 926,787

[22] Filed: Sep. 10, 1997

[51] Int. Cl.⁶ .................................................. B60R 25/02
[52] U.S. Cl. ................................. 70/209; 70/226; 70/238
[58] Field of Search ............................. 70/209–212, 225, 70/226, 237, 238

[56] References Cited

U.S. PATENT DOCUMENTS

| | | |
|---|---|---|
| D. 289,491 | 4/1987 | Johnson . |
| D. 306,252 | 2/1990 | Johnson . |
| 475,305 | 5/1892 | Follett . |
| 1,044,387 | 11/1912 | Hodge . |
| 1,142,780 | 6/1915 | Younger . |
| 1,154,389 | 9/1915 | Fogalsang . |
| 1,168,146 | 1/1916 | Barnes . |
| 1,329,913 | 2/1920 | McGuire . |
| 1,368,054 | 2/1921 | Recher . |
| 1,388,691 | 8/1921 | Bergen . |
| 1,395,532 | 11/1921 | Tilden . |
| 2,458,002 | 10/1949 | Kaskaras . |
| 2,491,609 | 2/1949 | George . |
| 2,662,961 | 8/1953 | Sargent . |
| 3,274,851 | 9/1966 | Geller . |
| 3,982,602 | 9/1976 | Gorman . |
| 4,166,400 | 9/1979 | Manning et al. . |
| 4,186,576 | 2/1980 | Means et al. . |
| 4,327,601 | 5/1982 | Vivian, Jr. . |
| 4,413,490 | 11/1983 | Nielson, Jr. . |
| 4,738,127 | 4/1988 | Johnson . |
| 4,777,811 | 10/1988 | Binklay et al. . |
| 4,800,775 | 1/1989 | Juchi . |
| 4,856,308 | 8/1989 | Johnson . |
| 4,935,047 | 6/1990 | Wu . |
| 4,961,331 | 10/1990 | Winner . |
| 5,007,259 | 4/1991 | Mellard . |
| 5,031,429 | 7/1991 | Wang . |
| 5,115,652 | 5/1992 | Starmer . |
| 5,199,284 | 4/1993 | Lin . |
| 5,275,030 | 1/1994 | Cole . |
| 5,297,406 | 3/1994 | Lin . |

(List continued on next page.)

FOREIGN PATENT DOCUMENTS

| | | |
|---|---|---|
| 562201 | 1/1983 | Australia . |
| 919367 | 11/1946 | France . |
| 2501134 | 3/1981 | France . |
| 2487275 | 1/1982 | France . |
| 2580243 | 10/1986 | France . |
| 389215 | 1/1924 | Germany . |
| 684481 | 11/1939 | Germany . |
| 2718291 | 10/1978 | Germany . |
| 584555 | 10/1958 | Italy . |
| 142638 | 9/1990 | Japan . |
| 228807 | 2/1994 | Taiwan . |
| 361686 | 11/1931 | United Kingdom . |
| 2110175 | 6/1983 | United Kingdom . |
| 2206552 | 1/1989 | United Kingdom . |
| PCT/AU91/ 00415 | 9/1991 | WIPO . |

OTHER PUBLICATIONS

Box container of "The Cap" by Etc'cessories.

*Primary Examiner*—Suzanne Dino Barrett
*Attorney, Agent, or Firm*—Vickers, Daniels & Young

[57] ABSTRACT

A motor vehicle security device for protecting against the cutting of an automobile steering wheel which includes a protective member made of cut-resistant material covering the steering wheel rim and a connector for attaching the protective member to the steering wheel rim. The protective member radially and circumferentially overlies the steering wheel rim to limit access to the rim and protect against cutting of the rim. The protective member includes two or more plate sections which can be collapsed into a smaller form for convenient storage. The protective member also includes a guide member to limit the movement of the plate sections with respect to one another.

49 Claims, 11 Drawing Sheets

U.S. PATENT DOCUMENTS

| | | |
|---|---|---|
| 5,353,614 | 10/1994 | Anderson . |
| 5,381,679 | 1/1995 | Cummins . |
| 5,415,018 | 5/1995 | Ferrante . |
| 5,431,033 | 7/1995 | Barrett . |
| 5,450,736 | 9/1995 | Volkmar . |
| 5,454,240 | 10/1995 | Whitney . |
| 5,454,243 | 10/1995 | Inpastato . |
| 5,537,847 | 7/1996 | Dalton et al. . |
| 5,540,067 | 7/1996 | Kim . |
| 5,548,983 | 8/1996 | Hart . |
| 5,613,383 | 3/1997 | Banez . |
| 5,619,873 | 4/1997 | Wood . |
| 5,735,149 | 4/1998 | Winner, Jr. ................................ 70/209 |
| 5,755,123 | 5/1998 | Winner, Jr. ................................ 70/209 |

STEERING WHEEL PROTECTION DEVICE

The present invention relates to the art of anti-theft devices for motor vehicles and, more particularly, to a vehicle security device which protects against unauthorized operation and theft of the vehicle by limiting access to the steering wheel.

INCORPORATION BY REFERENCE

U.S. Pat. Nos. Des. 289,491 dated Apr. 28, 1987; U.S. Pat. Nos. 4,738,127 dated Apr. 19, 1988; 4,856,308 dated Aug. 15, 1989; 306,252 dated Feb. 27, 1990; 4,935,047 dated Jun. 19, 1990; and 4,961,331 dated Oct. 9, 1990 are incorporated by reference herein and illustrate types of mechanical security devices which are a part of or can be used in conjunction with the present invention.

BACKGROUND OF THE INVENTION

Over the past several years, there has been a growing demand by vehicle owners to better secure their vehicles against theft. Factors such as inconveniences and insurance premiums associated with the theft of a vehicle or vehicle components have resulted in a demand for mechanisms to better secure a vehicle. In an effort to solve these security problems and demands, a substantial industry has been developed to manufacture and promote various mechanisms which deter theft of a vehicle. Common vehicle security mechanisms include electronic devices such as alarms and so called "killer" switches which disable the engine and/or ignition of a vehicle unless bypassed by the authorized operator. Mechanical devices such as steering wheel locks, which inhibit unauthorized operation of the vehicle by constraining the steering wheel against rotation when locked in position, are also available. However, all these vehicle security systems suffer from numerous disadvantages in terms of cost, convenience and effectiveness.

Electronic alarms for motor vehicles have become well known in recent years and also have many disadvantages associated with their use. Such alarms are designed to be highly sensitive to physical force and/or motion and activate the alarm when the vehicle is disturbed in any way. Consequently, such alarms are frequently activated accidentally by parking lot and service station attendants and/or the owners themselves who neglect to deactivate the alarm system. The electronic alarms are also prone to malfunction and tend to drain the battery of the vehicle. Finally, many of these electronic alarms require professional installation, which is of high cost to a purchaser.

So called "killer" switches have also become popular in recent years. These switches serve to disable the vehicle usually at the ignition system, unless the authorized operator deactivates the killer switch. These types of systems are very costly and suffer from the usual reliability problems associated with electronic devices installed in a motor vehicle. In addition, these devices require professional retailers to install the device after the vehicle leaves the manufacturing plant for a substantial labor charge, since many of these systems are too complex for the general public to self-assemble. In addition, due to the complexity of these systems, a typical motorist is not knowledgeable regarding the deactivation of the system in case of a malfunction.

Vehicle security systems also include mechanical anti-theft devices which restrain relative movement of various components within the vehicle such as a steering wheel, gas pedal, clutch or brake. Many of these mechanical designs include mechanical locks comprising a pair of hooks at opposite ends of an elongated locking apparatus whereby the hooks are engaged to the steering wheel rim or the steering wheel rim and another component within the vehicle. These mechanical locks provide vehicle security without the cost and complexity of electronic security systems and further provide the convenience of being usable selectively at the discretion of the motorist, as opposed to being an ever present fixture of the vehicle which must inconveniently be attended to every time the vehicle is operated. Nevertheless, mechanical locks positioned on the steering wheel or on the steering wheel and another component of the vehicle suffer from various short comings which essentially reduce their effectiveness. The hooks and locks are typically made of hardened steel which resists bending, cutting or prying. While the mechanical locks themselves are relatively indestructible and unremovable by a thief, a thief can bypass such a security system by cutting through the steering wheel rim and removing the mechanical security device. A reinforced steering wheel, which resists being cut, can be installed; however, such steering wheel systems require professional installation and can be very expensive. Also, certain vehicles are equipped with specially designed steering wheels that include various features, such as air bags, light switches and cruise control switches. These specially designed steering wheels cannot be replaced by a generic reinforced steering wheel. Further, these specially designed steering wheels have also become susceptible to theft. The growing demand for air bags has created a market for air bags and air bag parts. As a result, thieves are illegally removing the air bag and various air bag components from vehicles. Mechanical locks are not designed to protect vandalism and/or theft of components of steering wheels.

The prior art is thus seen to fail to provide a vehicle security device which is economical, simple, and convenient to use and yet which is thoroughly effective in preventing theft of a vehicle.

SUMMARY OF INVENTION

The present invention overcomes the above-described disadvantages and others and provides a vehicle security device which is inexpensive, convenient and effective in protecting against theft of a motor vehicle.

In accordance with the principal feature of the present invention, there is provided a vehicle security device for limiting access to a steering wheel. The steering wheel includes a rim having a given diameter and a front face, a back face and radially inner and outer edges. The security device is designed to preferably have or form a generally circular protective face plate having a central axis; however, the face plate can have a variety of other shapes. The face plate is preferably designed to have an outwardly extending peripheral edge which extends in at least one position to the rim of the steering wheel. If the face plate has a generally circular shape, the largest diameter of the face plate is preferably at least as large as the inner diameter of the steering wheel rim. The face plate is preferably formed from a cut resistant material. The face plate is divided into at least two plate sections and includes a mechanical arrangement for connecting together each of the plate sections. Each of the plate sections has an outer edge, a base edge, two side edges and includes at least one opening positioned adjacent to the outer edge. The mechanical arrangement for connecting each plate section together includes a pivot mechanism and a guide mechanism for positioning and limiting the position of the plate sections about the face plate central axis.

In accordance with another aspect of the present invention, each plate section is connected to the pivot mechanism for movement between at least two positions about the central axis of the face plate whereby one position is a collapsed position and a second position is an open position. For a security device having a circular face plate, the diameter of the protective device in the open position is selected to cover at least the radially inner edge of the steering wheel rim. Preferably, the diameter of the protective device is 15–18 inches so as to cover the outer edge of most foreign and domestic automobile steering wheels. The protective device is made of a cut resistant material to resist unauthorized users from gaining access to the steering wheel. Preferably, the cut resistant material is a metallic material such as steel, steel alloys, or other metal alloys. The metallic material can be hardened to further resist cutting. The face plate can be coated with a material such as rubber or plastic to inhibit oxidation of the metallic material and reduce or prevent damage to the steering wheel or vehicle.

In accordance with another aspect of the present invention, each plate section has generally similar dimensions. The security device is preferably divided into three or four plate sections. These plate sections are preferably connected at the central axis of the protective plate. The plate sections can be positioned in their open position to symmetrically orient each plate section and preferably form a generally circular protective member. The connection location for each plate section is positioned radially inwardly from the base edge of each plate section. The plurality of plate sections are preferably connected together by a pin or rivet. The plate sections are preferably designed so as to overlap when positioned in the open position so as to provide added security to the steering wheel. Therefore, if the face plate is circular and made up of three plate sections, each plate section is preferably designed to have a pie-section-like shape which has an outer edge arc which is greater than 60 degrees.

In accordance with another aspect of the present invention, one or more openings are included on at least one plate section. Preferably at least one opening is included on each plate section. The one or more openings are used to facilitate in the connecting of the face plate to the steering wheel; however, the openings may have other functions such as to reduce the weight of the security device, allow access to a particular portion of the steering wheel, provide for easier handling of the security device, and/or make the security device aesthetically pleasing. Preferably, the openings on the plate sections are positioned so that at least two openings are positioned diametrically apart on the security device when the plate sections are positioned in the completely open position. The openings on the plates are positioned such that at least two openings on adjacent plate sections overlap one another when at least three plate sections are used and the plate sections are positioned in the open position. Preferably, two openings overlap for a three plate section security device. For a four section security, two pairs of openings preferably overlap. The openings are sized and positioned on the plated sections to allow the protective device to be connected to the steering wheel by a mechanical lock device such as lock devices disclosed in U.S. Pat. Nos. 4,738,127; 4,856,308; 4,935,047 and 4,961,331.

In accordance with still another aspect of the present invention, the guide mechanism for the plate sections limits the position of the plate sections about the pivot mechanism. Preferably the guide mechanism also rigidifies the plate sections to facilitate the limiting of access to the steering wheel. The guide mechanism includes a guide passage such as a slot, groove, channel, ridge, etc., positioned on at least one of the plate sections. The guide passage is preferably curvilinear in shape and preferably concentrically positioned on the plate section about the pivot mechanism. For security devices having a circular face plate and a pivot mechanism located substantially at the face plate central axis, the guide mechanism is located substantially concentrically about the face plate central axis. The guide mechanism is preferably positioned inwardly positioned from an edge of the plate sections; however, at least a portion of the guide mechanism can be positioned outwardly from the edge of the plate sections. The guide mechanism also includes a guide coupler such as a pin which slidably moves, i.e. slides, rolls, etc., within the guide passage. Preferably, the guide mechanism includes a guide slot and guide pin arrangement. The guide coupler is preferably rigidly attached to a plate section and inserted into a guide passage of an adjacent plate section. The guide mechanism is adapted to orient the plate sections about the pivot mechanism. If a slot arrangement is used such as a curvilinear slot, the slot arrangement is designed to limit the slidable range of the pin to define the complete collapsed and complete opened position of two adjacent plate sections.

In accordance with another aspect of the present invention, an attachment mechanism attaches the face plate to the steering wheel. The attachment mechanism preferably includes at least one hook which extends through the opening in a plate section and about the edge of the steering wheel rim. The hook preferably extend through the plate section opening and about the inner edge of the steering wheel rim. The attachment mechanism can be directly attached to the plate or be a separate arrangement used in conjunction with the face plate.

In accordance with yet another aspect of the present invention, the attachment mechanism locks the plate section in the open position.

In accordance with still yet another aspect of the present invention, a flange is attached to the peripheral edge of the face plate. The flange preferably extends outward from the peripheral edge to further limit access to said steering wheel. The flange is preferably attached to substantially the entire peripheral edge of the face plate and is preferably cylindrical in shape.

In accordance with another aspect of the present invention, the protective device is shaped to accommodate steering wheels which include an air bag compartment which can protrude from the face of the steering wheel.

In another aspect of the present invention, the face plate is rigidified to resist the bending of the face plate. Rigidification can be accomplished by hardening the material of the face plate, re-enforcing the face plate and/or corrugating the face plate.

In accordance with another aspect of the invention, there is provided a vehicle security device connected to the steering wheel of a motor vehicle which protects the steering wheel rim from being cut and which limits rotation of the steering wheel. The rotation of the steering wheel is preferably limited by a radial protrusion. The radial protrusion is preferably made of a cut resistant material.

The principal object of the present invention is to provide a security device which protects a motor vehicle against theft.

Another object of the present invention is to provide a vehicle security device which is economical and convenient to use.

Yet another object of the invention is to provide a vehicle security device which enables a steering wheel to resist vandalism and to protect against automotive theft.

Still another object of the present invention is to provide a vehicle security device which limits access to the rim of the steering wheel to prevent cutting or severing of the rim.

Yet another object of the present invention is to provide a vehicle security device having a flange which further limits access to a steering wheel rim.

Another object of the invention is to provide a vehicle security device which prevents rotation of the steering wheel.

Still yet another object of the present invention is to provide a vehicle security device which can protect all types of shapes of steering wheels.

Another object of the present invention is to provide a vehicle security device which prevents the removal of air bags from a steering wheel.

Yet another object of the present invention is to provide a vehicle security device which can be easily and conveniently stored when not in use.

Still another object of the present invention is to provide a vehicle security device which has multiple sections which sections can be collapsed for storage.

Another object of the present invention is to provide a vehicle security device which includes a multiple sections and a guide mechanism for limiting the movement of the multiple sections with respect to one another.

Yet another object of the present invention is to provide a vehicle security device which includes a guide mechanism which rigidities the multiple sections of the security device.

Still yet another object of the present invention is to provide a vehicle security device which includes openings and wherein the openings are positioned such that at least two openings overlap when the security device is positioned on the steering wheel and wherein the overlapping openings can be used to lock, secure, immobilize, position, etc. at least two sections in place.

BRIEF DESCRIPTION OF THE DRAWINGS

The foregoing and other objects of the invention will become apparent from the following description of the preferred embodiments thereof taken together with the accompanying drawings in which.

DETAILED DESCRIPTION OF THE PREFERRED EMBODIMENTS

Figure 1:
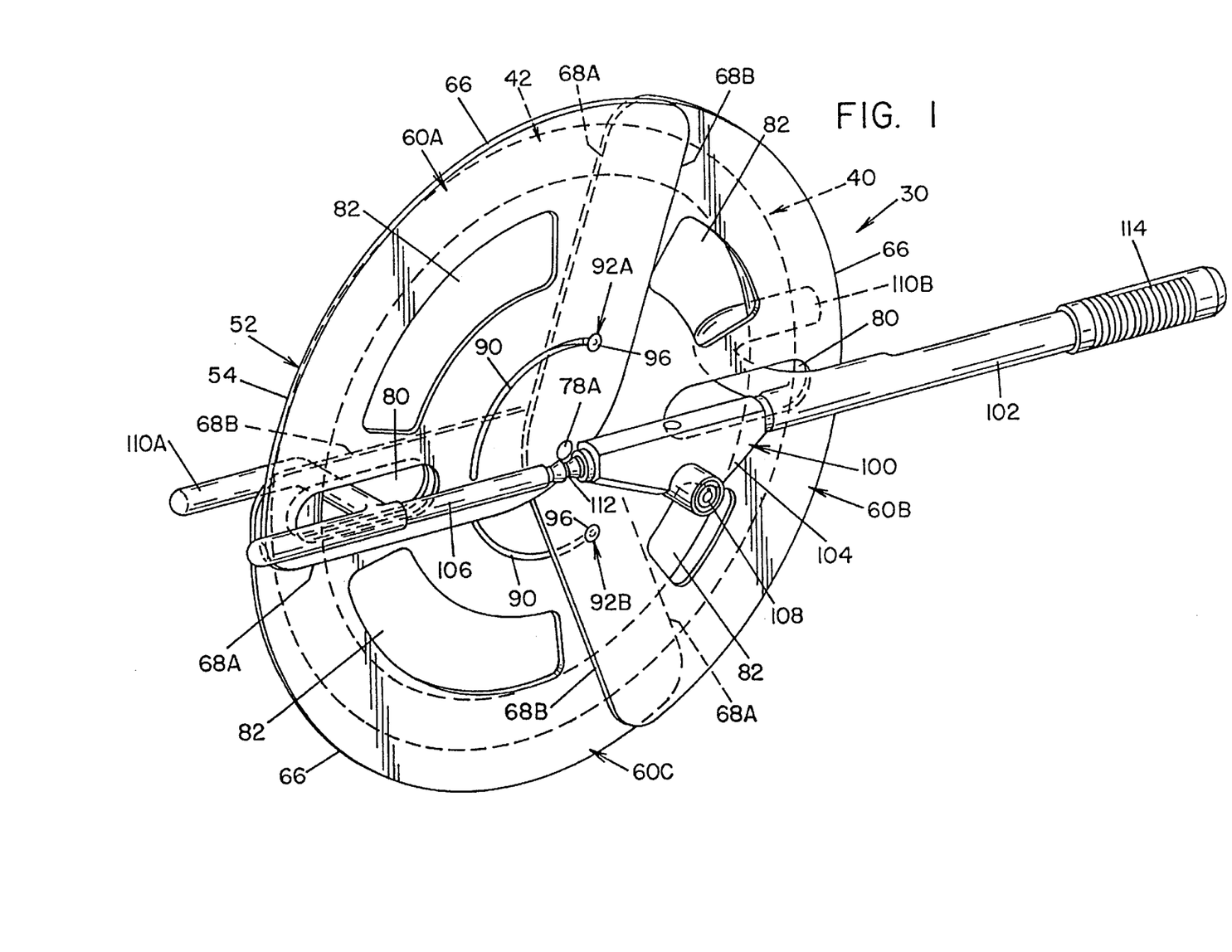
FIG. 1 is a perspective view of a vehicle security device in accordance with the present invention.
Figure 2:
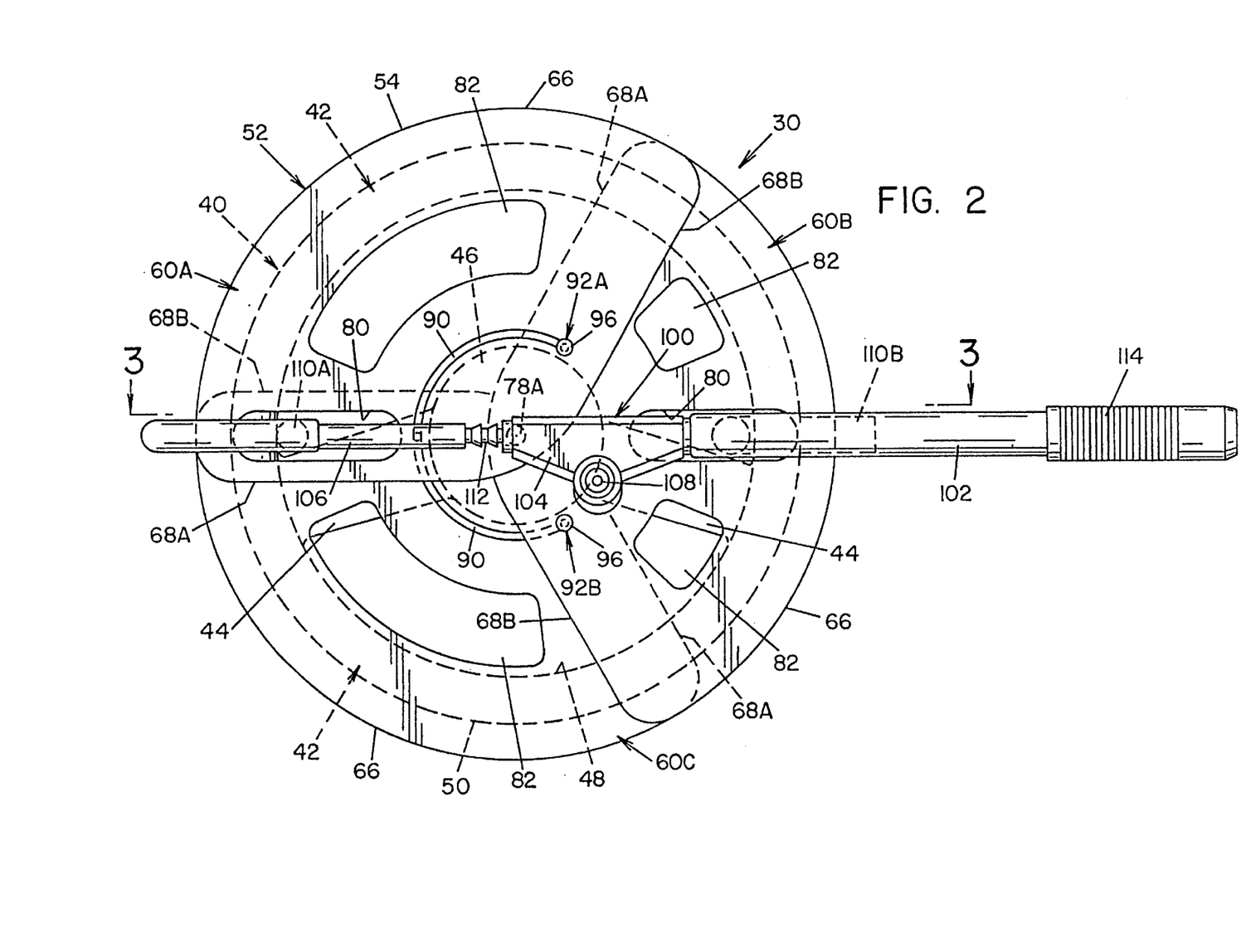
FIG. 2 is a plane view of the vehicle security device as shown in FIG. 1.
Figure 3:
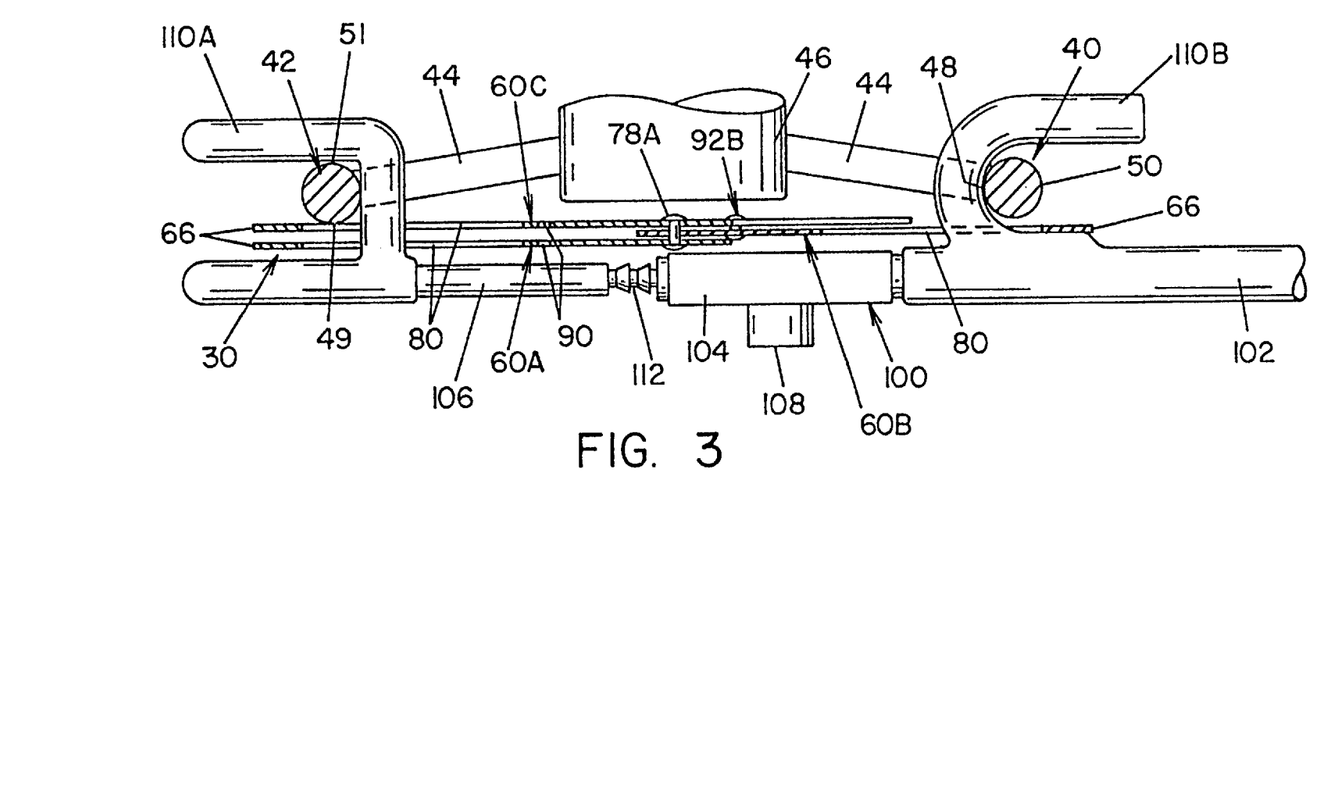
FIG. 3 is a cross-sectional view taken along line 3—3 in FIG. 2.

Referring now to the drawings wherein the showings are for the purpose of illustrating preferred embodiments of the invention only and not for purposes of limiting the same, FIGS. 1–5 illustrate one embodiment of security device 30. As shown in FIGS. 1–2, security device 30 is positioned on the face of a vehicle steering wheel 40. Steering wheel 40 includes a hub 46 and at least one steering wheel column 44 connected to hub 46 to steering wheel rim 42 which surrounds hub 46. Steering wheel rim 42 lies in a plane and, preferably, hub 46 lies in or recedes from the plane of steering wheel rim 42. The steering wheel rim 42 has a given diameter and a front face 49, a back face 51 and a radially inner edge 48 and outer edge 50. Security device 30 is placed over steering wheel 40 to limit access to and protect against the cutting of steering wheel rim 42. The security device is positioned over the face of steering wheel rim 42 in a plane parallel to the plane of steering wheel rim 42. The placement of security device 30 on steering wheel 40 is such that it is very difficult to cut rim 42 without also having to cut security device 30. Security device 30 is of a material which cannot be readily cut, especially by bolt cutters or hack saws.

Preferably, security device 30 is made of a tempered steel face plate 52 preferably having a thickness of at least about ⅛ of an inch. While not shown, face plate 52 is preferably coated with a non-abrasive substance such as plastic, to protect steering wheel 40 from damage such as from scratching which may occur during installation of security device 30 onto steering wheel rim 42. The coating also provides corrosion protection to the face plate. Security device 30 includes a generally circular protective face plate 52 and an attachment device 100 to securely attach face plate 52 to rim 42. Face plate 52 is preferably circular in shape as shown in FIG. 1 and includes a central axis. Face plate 52 also includes an outwardly extending peripheral edge 54 and preferably has a diameter of at least the diameter of the inner edge 48 of steering wheel rim 42. Face plate 52 is formed of a cut resistant material to prevent or severally retard damage to or cutting of face plate 52.

As illustrated in FIGS. 1–7, face plate 52 is made up of three plate sections 60 A–C. These plate sections are connected together at generally the central axis of face plate 52. Plate sections 60A–C are connected together by inserting a pivot pin 78A through a pivot holes 72A–C of plate sections 60A, 60B and 60C, respectively. Pivot holes 72A–C are positioned radially inwardly from plate base edge 70 such that the hole lies within the central axis of the face plate. The end of pivot pin 78A is preferably machined to prevent the pin end from being repassed through the pivot hole in plate section 60C. The pivot pin allows all three plate sections to independently rotate about the central axis of face plate 52. Each of the plate sections include an outer edge 66, two side edges 68A–B and a base edge 70. Each plate section also includes at least one hook opening 80 positioned inwardly from plate outer edge 66. The plate sections are connected together in such a manner that the plate sections are moveable to form a collapsed position as shown in FIG. 5A, a partially open position as shown in FIG. 5B and an open position as shown in FIG. 5C.

Figure 4:
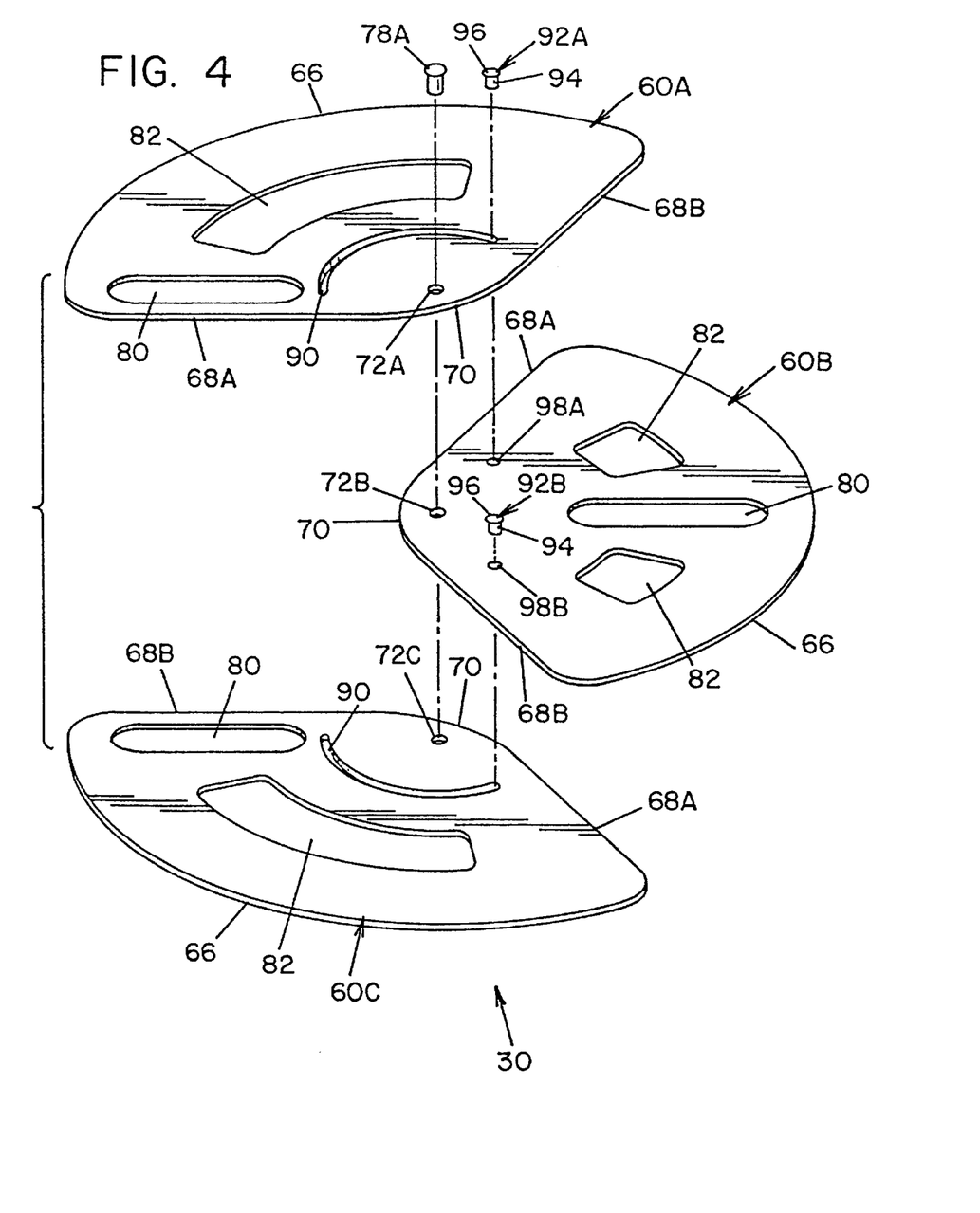
FIG. 4 is a partial exploded view of the face plate of the vehicle device shown in FIG. 1.
Figure 6:
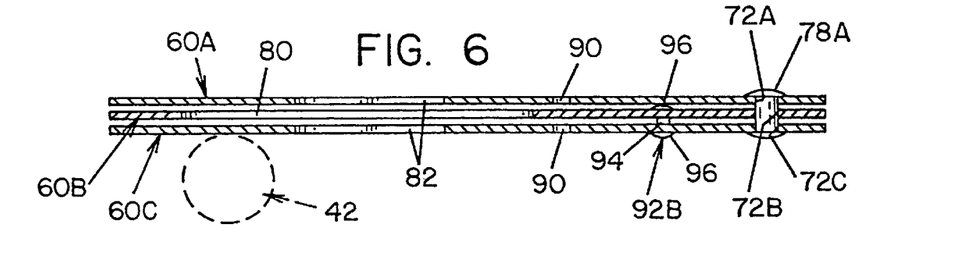
FIG. 6 is a cross-sectional view taken along line 6—6 in FIG. 5A.

Referring now to FIG. 4, face plate 52 is formed by placing plate section 60A on top of plate section 60B. Pivot hole 72A and 72B are aligned together at the central axis of face plate 52. Pivot pin 78A is inserted through pivot holes 72A and 72B thereby attaching the plate section together. Plate section 60B is then placed on top of plate section 60C and pivot pin 78A is inserted through pivot hole 72C thereby attaching all three plate sections about the central axis of face plate 52. The plate sections are attached together by pivot pin 78A to allow the plate sections to move independently about the face plate central axis. The end of the pivot pin is preferably machined to prevent the end from completely passing through the pivot hole of plate section 60C. FIG. 4 also illustrates a guide system which limits the movement of plate sections 60A–C with respect to each other. The guide system includes guide slot 90 and/or a guide pin 92 on each plate section. Plate sections 60A and 60C both include guide slots. The guide slots are curvilinear in shape and radially positioned from the pivot holes 72A and 72C. The guide slot is positioned on the plate section such that the slot does not extend to the edge of the plate section. Guide pin 92A is connected to plate sections 60A and 60B by inserting pin body 94 through the guide slot of plate section 60A until pin head 96 contacts the guide slot and the pin hole 98 of plate section 60B. Pin head 96 is sized larger than the width of the guide slot to prevent the guide pin from passing through the guide slot. Pin hole 98A is preferably sized such that the pin body snugly fits into the hole. The end of the pin body is preferably machined to affix the pin body in the pin hole. The guide mechanism for plate sections 60B and 60C is similarly assembled. Guide pin 92B is inserted through pin hole 98B by passing the pin body through the pin hole until the pin head contacts the pin hole. The pin head is preferably sized larger than the pin hole to prevent the pin head from passing through the pin hole. The pin body is inserted through the guide slot of plate section 60C and the end of the pin body is machined to prevent the pin body completely passing through the guide slot. The guide pins are slidably moveable within the guide slot to allow limited rotation of the plate sections about the plate face central axis. The length of the pin body is selected to minimize the space between each plate section to deter an unauthorized user from inserting an instrument between the plate sections in an attempt to pry the sections apart. FIG. 6 illustrates the close proximity of each plate section.

Figure 5A:
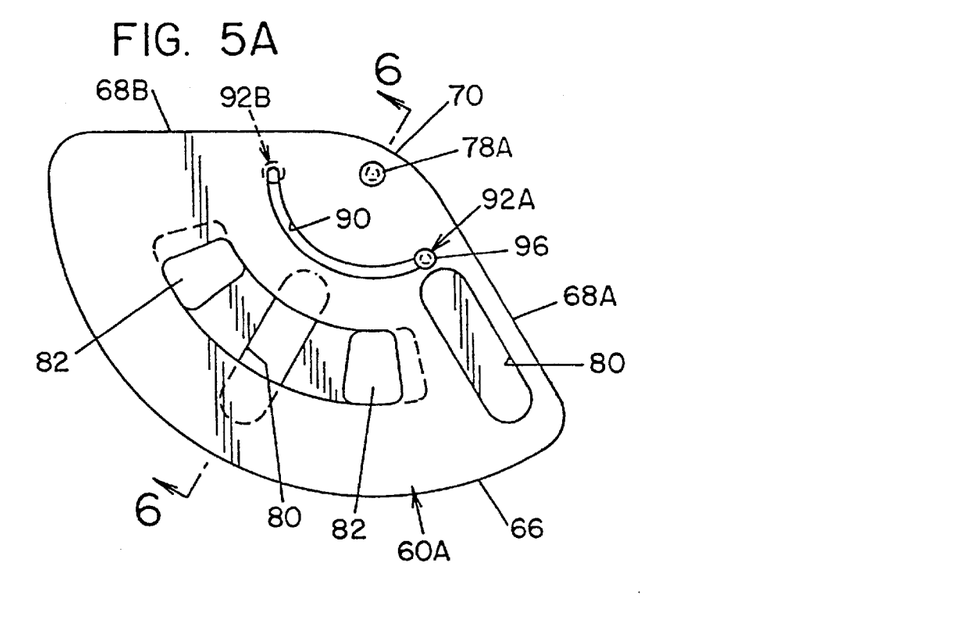
FIGS. 5A–5C illustrate the face plate of the security device in a collapsed, partially collapsed and open position.
Figure 5B:
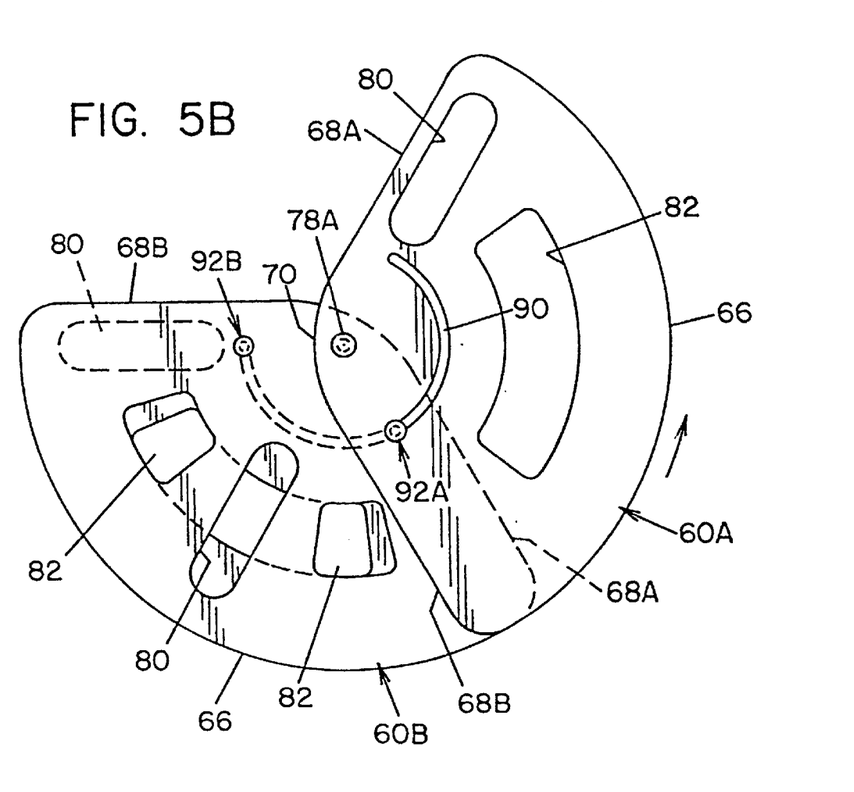
Figure 5C:
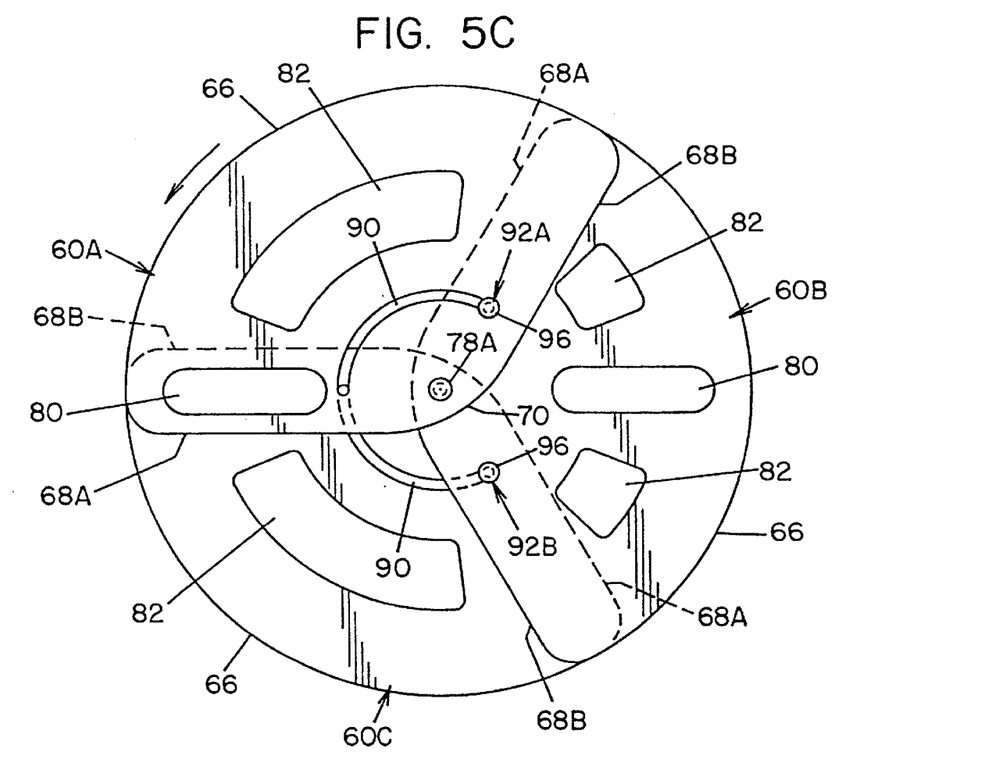

Referring now to FIGS. 5A–5C, the guide mechanism allows the plate sections to be moved in varying positions about the face plate central axis and relative to adjacent plate sections. FIG. 5A illustrates all three plate sections in a closed or collapsed position. This closed position reduces the surface area of the face plate and allows for easier storage.

FIG. 5B illustrates plate section 60A moved into its complete open position relative to plate section 60B. Plate sections 60B and 60C remain in the closed position. FIG. 5C illustrates all three plate sections in their open position. It is in this position that the plate sections form the generally circular face plate which is positioned on front face 49 of steering wheel rim 42.

Preferably, each of the plate section 60 has generally similar dimensions. The three plate sections are preferably pie shaped as shown in FIG. 4. Each plate section is sized slightly larger than a third of the surface area of the face plate so that the side edges and base edge of each plate section overlap. As illustrated in FIGS. 1–3 and 5C, the plate side edge plate section overlaps the side edge of each adjacent plate section when the plate sections are positioned in their open position. Referring now to FIG. 5C, side edge 68A of plate section 60A overlaps side edge 68B of plate section 60C, side edge 68B of plate section 60A overlaps side edge 68A of plate section 60B and side edge 68B of plate section 60B overlaps side edge 68A of plate section 60C. In addition, plate base edge 70 of each plate section overlaps the adjacent plate section due to the connection of the three face plates by pivot pin 78A. The overlapping side edges of the adjacent plate sections prevents or inhibits an unauthorized user from accessing steering wheel rim 42 by attempting to slip various types of cutting devices between the plate sections.

Referring now to FIG. 4, each plate section includes an opening 80. Each opening is preferable oblong shaped and positioned inwardly adjacent to the plate section edge. The opening is also positioned on each plate such that when the plate sections are all in their respective open positions, the face plate includes two openings spaced diametrically apart as shown in FIG. 5C. As shown in FIG. 4, the opening on plate section 60A is positioned near side edge 68A and the opening on plate section 60C is positioned near side edge 68B.

When the plate sections are moved to their open position, the openings of plate section 60A and 60C overlap and become aligned as shown in FIG. 5C. The opening of plate section 60B is evenly spaced between side edges 68A and 68B. This positioning of the opening on plate section 60B causes the opening to be positioned diametrically apart from the overlapped and aligned opening of plate sections 60A and 60C when all the plate sections are positioned in their respective open positions as shown in FIG. 5C.

Referring now to FIGS. 1, 2, 4 and 5, each plate section includes at least one surface opening 82. The surface opening can be of any shape and size. The surface openings are included in the plate sections to reduce the weight of the plate sections and to create designs in the face plate which are aesthetically pleasing to the automotive operator. The surface openings are sized and positioned so as not to compromise the structural integrity of the plate section. Further, the surface openings are preferably positioned so as not to expose the steering wheel rim when the face plate is attached to the steering wheel.

Referring now to FIGS. 1 and 2, security device 30 includes an attachment device to attach the face plate to the steering wheel. The attachment device may be detached or not detached from the face plate. As shown in FIGS. 1 and 2, the attachment device is an unattached security lock 100 similar to the one incorporated herein by reference. One such security lock which is preferably used is a security lock sold by Winner International under the registered trademark THE CLUB.

Security lock 100 is comprised of a tubular body portion 102 having a handle 114 and a lock housing 104, a rod member 106 which is dimensioned to move in telescopic fashion within body portion 102 and lock housing 104, key lock 108 which locks rod member 106 in position with respect to body portion 102 and lock housing 104, and two lock hooks 110B and 110A respectively positioned on body portion 102 and rod member 106. Rod member 106 includes grooves 112 which, as shown in the aforementioned patents, allow rod member 106 to preferably ratchet into position in only one direction when key lock 108 is in the locked position. As illustrated in FIGS. 1 and 2, lock hooks 110A and 110B have a U-shaped design and are open outwardly relatively to one another. Lock 100 is preferably made of a hardened steel which resists cutting by a saw or bolt cutter.

As illustrated in FIGS. 1 and 2, face plate 52 is connected to steering wheel rim 42 by lock 100. More particularly in this respect, face plate 52 is secured to steering wheel 40 by passing hook 110A through the first opening 80 and about rim 42 and then ratchetly moving rod member 106 from body portion 102 and lock housing 104 until hook 110B can be passed through the second opening 80 and then into engagement with corresponding portion of rim 42. Openings 80 are of sufficient width and length to allow lock hook 110A and 110B to be passed thereto. Further, openings 80 are preferably positioned such that when the face plate is positioned onto the steering wheel, the openings expose at least inner edge 48 of rim 42 to facilitate easier placement of the lock hooks about the rim and face plate. As best illustrated in FIG. 1, the lock hooks are designed to hold the face plate to the steering wheel rim and prevent removal of the face plate from the steering wheel. The lock hooks also prevent the closing or collapsing of the plate sections. When lock hook 110A is inserted into the overlapping openings of plate sections 60A and 60C, the plate sections are maintained in their open position which in turn forces plate section 60B to be maintained in an open position due to the guide mechanism.

Security lock 100 preferably includes a tubular body 102 which extends radially outward of steering wheel rim 42 when mounted thereon. Such extension of tubular body 102 is designed to be of sufficient length to engage either the interior of the vehicle or the operator when attached to steering wheel 40 to prevent the complete rotation of the steering wheel. Security lock 100, as described in the reference patent herein, secures a vehicle against theft by not allowing the operator to steer the vehicle. Face plate 52 provides the additional security of further limiting access to and the cutting of steering wheel rim 42 to optimize the security against theft. Both security lock 100 and face plate 52 are made of cut resistant materials to protect against the cutting and/or disabling of the lock, security device or steering wheel rim 42.

Figure 7:
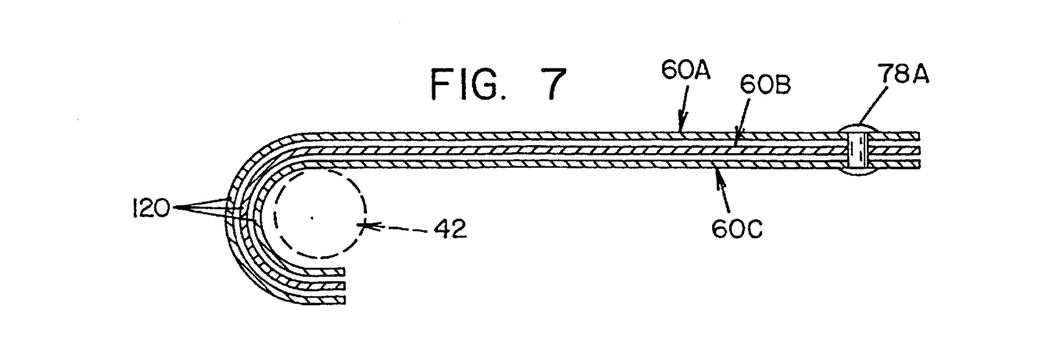
FIG. 7 is a modification of the cross-sectional view of FIG. 6 which illustrates the incorporation of a flange on the face plate.

Referring now to FIG. 7, FIG. 7 is a modified cross-sectional view of FIG. 5A and illustrates the incorporation of a plate flange 120 on the plate section outer edge 66. As illustrated in FIG. 7, flange 120 is preferably generally cylindrical in shape so as to at least partially encircle rim 42 thereby providing additional protection against the cutting of steering wheel rim 42. The flange also provides the face plate with an additional means of securing the face plate to steering wheel 40 by encircling steering wheel rim 42 and maintaining the face plate on steering wheel 40.

Figure 8:
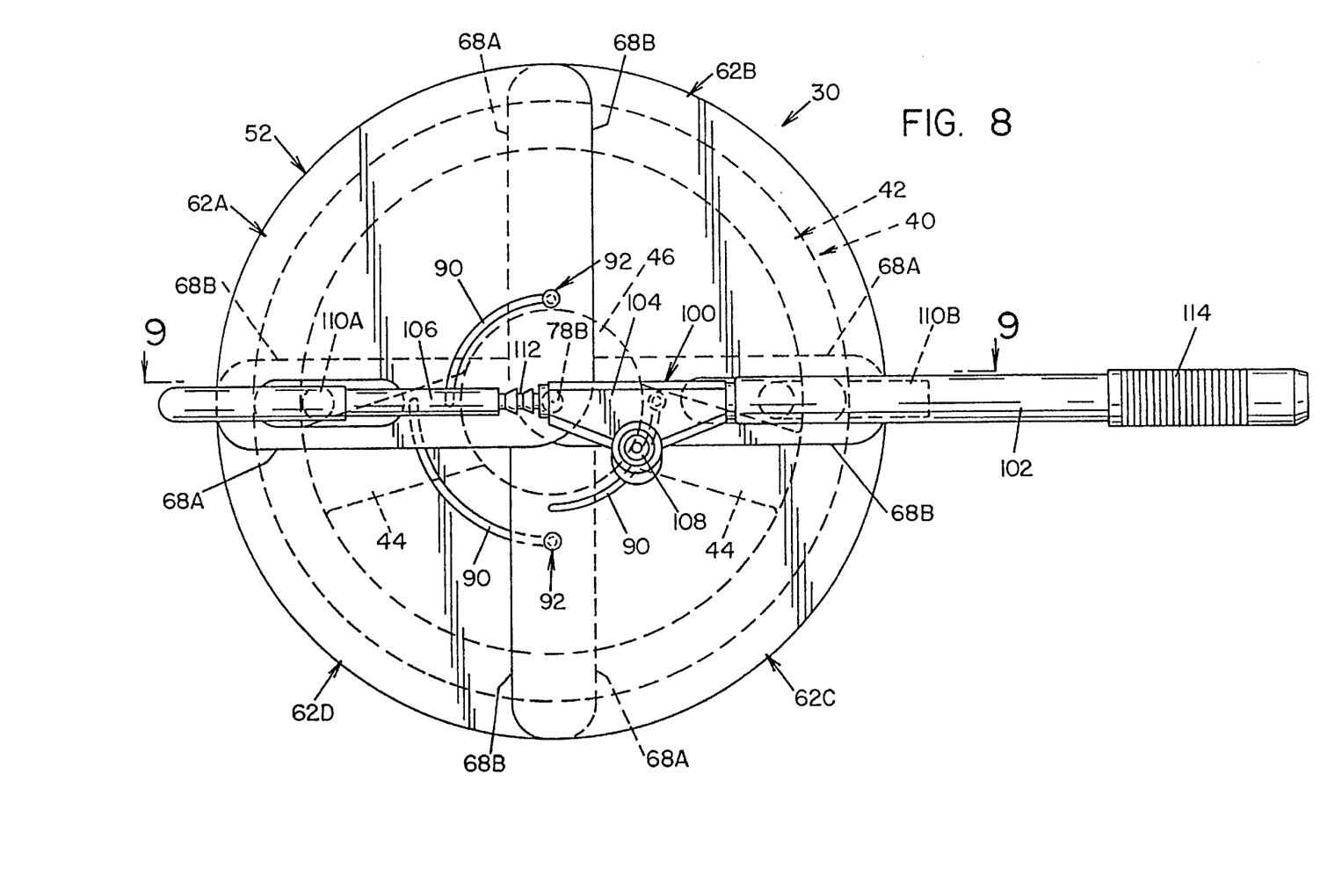
FIG. 8 is a plain view of a further embodiment of the vehicle security device in accordance with the present invention which illustrates four plate sections of the face plate.
Figure 9:
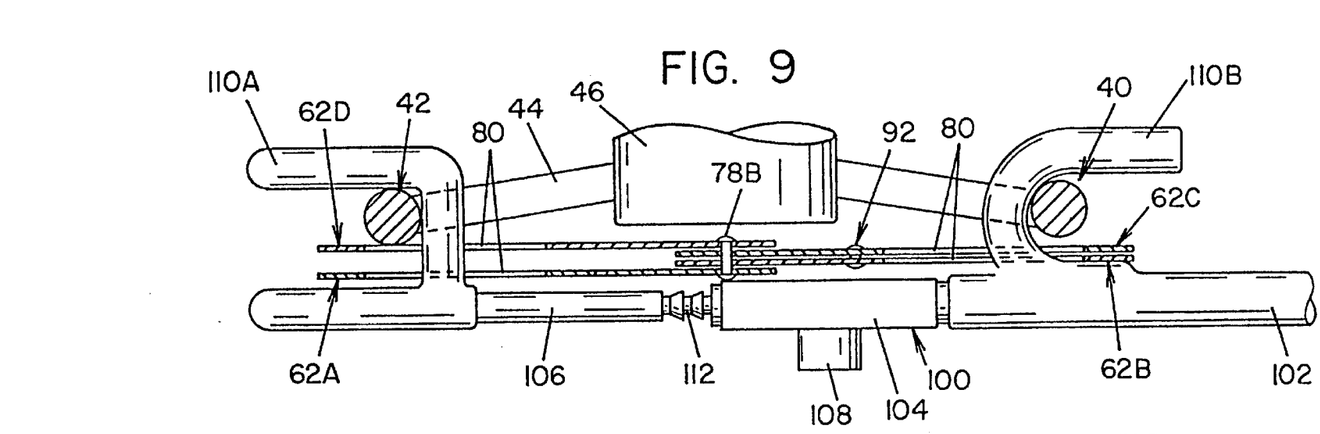
FIG. 9 is a cross-sectional elevation view taken along line 9—9 in FIG. 8.
Figure 10:
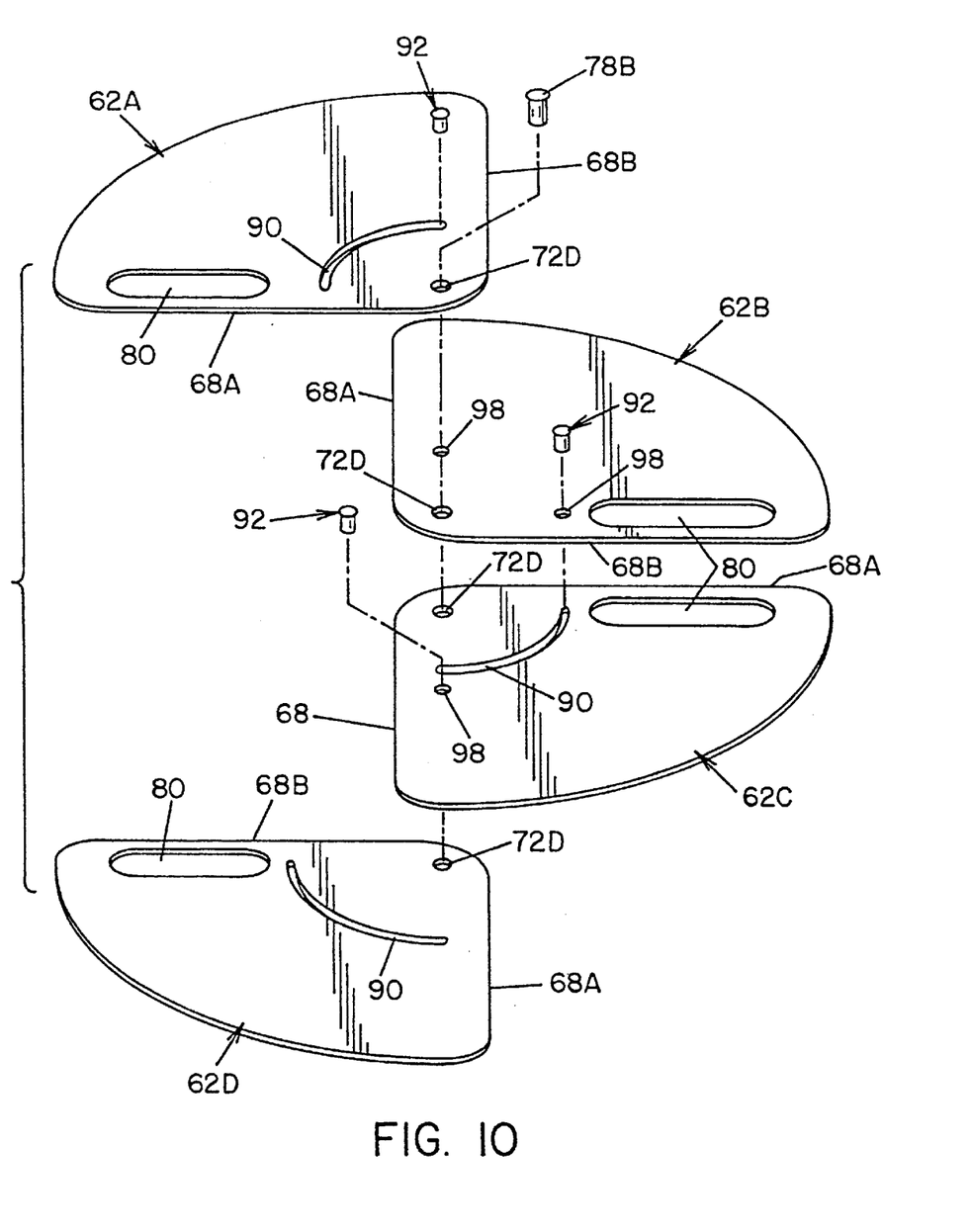
FIG. 10 is a partial exploded view of the face plate of the present invention shown in FIG. 8.

Referring now to FIGS. 8–13, a second embodiment of the invention is disclosed wherein face plate 52 is made up of four plate sections 62 A–D. Similar to the three section face plate, the four section face plate is connected together by pivot pin 78B inserted through pivot holes 72D in each plate section as illustrated in FIG. 10. Each plate section includes an opening 80 located adjacent to one of the two plate edges 68A or 68B. On plate sections 62A and 62C, opening is located adjacent to plate edge 68A. On plate sections 62B and 62D, opening is located adjacent to plate edge 68B. The openings are positioned on each plate section such that when all the plate sections are in their open position, openings on plate sections 62A and 62D overlap and align and openings on plate sections 62B and 62C overlap and align as shown in FIG. 11D. Further, the two sets of overlapping and aligned openings are spaced diametrically apart on the face plate. Each plate section is pie wedge shaped and is generally the same shape and size. Each plate section is larger than a quarter of the surface area of the face plate such that the side and base edges of each plate section overlap an adjacent plate section in the open position as illustrated in FIG. 11D. It will be appreciated that more than four plate sections can be used to form the face plate. Further, varying shapes of plate sections can be used for a circular face plate or non-circular face plate. The guide slots, guide pins, pin holes, pivot hole(s) and pivot pins) should be properly positioned for other plate section configurations. Although not shown, each plate section may include a surface opening to reduce the plate section weight and/or form an aesthetically pleasing plate section.

The four plate sections include a guide mechanism to control the collapsed or closed position, partially closed or open positions and completely open position of the plate sections as illustrated in FIGS. 11A–D. The guide mechanism is very similar to the guide mechanism for the three plate section face plate in that a guide slot 90 and guide pin 92 are used. As illustrated in FIG. 10, plate section 62A includes a guide slot wherein a guide pin is inserted through the guide slot and attached to plate section 62B at pin hole 98 thereby controlling the relative movement of plate sections 62A and 62B. Another guide pin is inserted through a second pin hole and through a guide slot in plate section 62C thereby controlling the relative movement of plate sections 62B and 62C. A third guide pin is inserted through a pin hole in plate section 62C and into the guide slot in plate section 62D thereby controlling the relative movement of plate sections 62C and 62D. The guide pins are all machined to prevent the pins from being removed from their respective guide slot and pin hole. Referring now to FIGS. 8 and 9, security lock 100 attaches face plate 52 to steering wheel rim 42 by inserting the lock hook 110A and 110B through the respective openings 80 and about rim 42. Once the lock hooks are inserted through the openings, the plates are maintained in their open position.

Figure 11A:
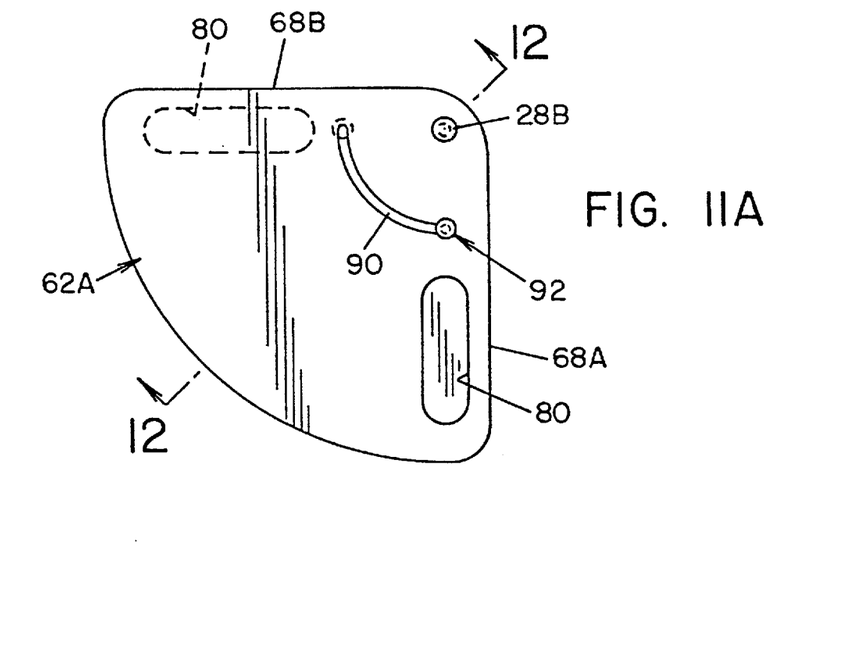
FIGS. 11A–11D illustrate the face plate shown in FIG. 8 in a collapsed, partially collapsed, and open position.
Figure 11B:
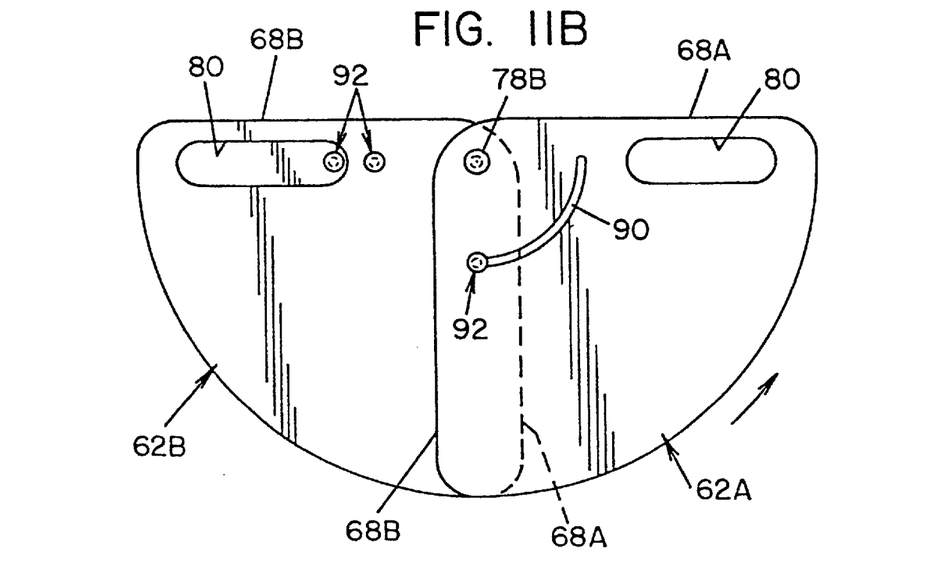
Figure 11C:
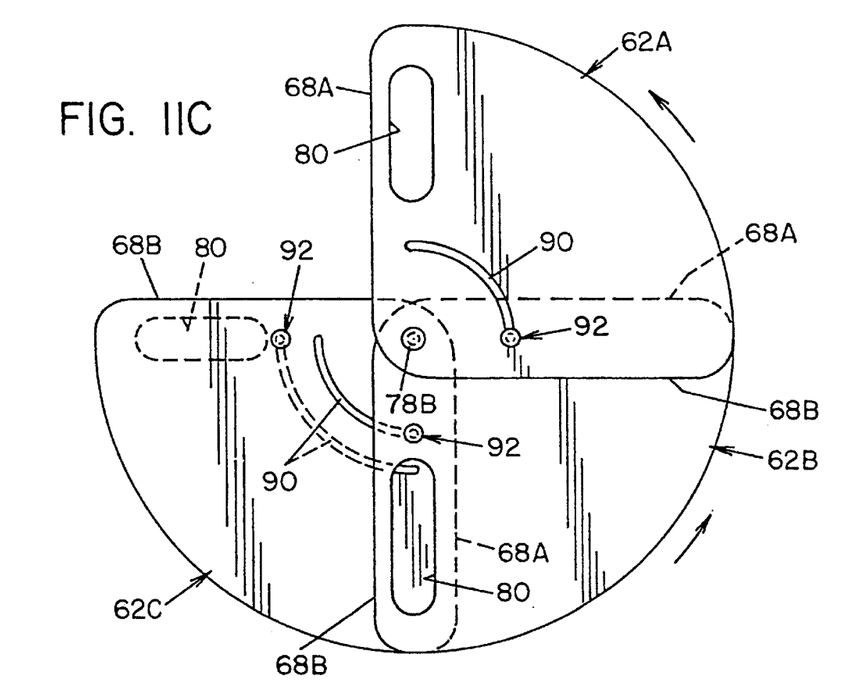
Figure 11D:
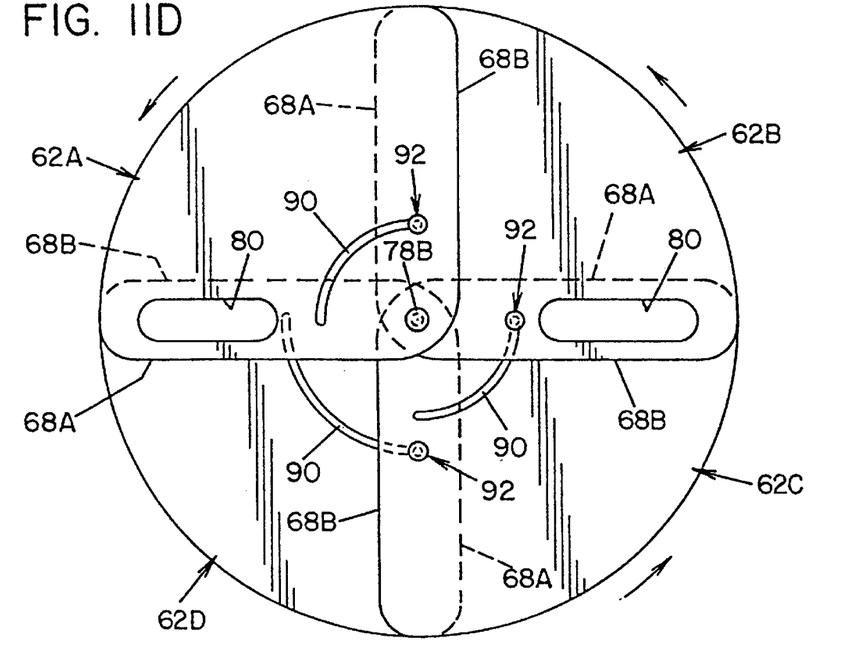
Figure 12:
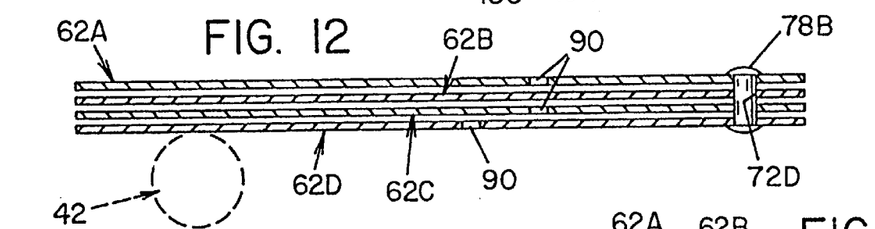
FIG. 12 is a cross-sectional view taken along line 12—12 of FIG. 11A.
Figure 13:
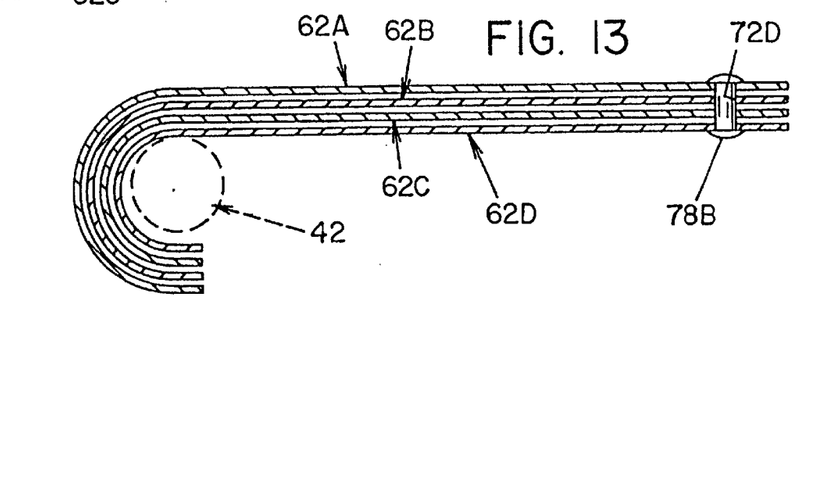
FIG. 13 is a modification of the cross-section view of FIG. 12 which illustrates the incorporation of a flange on the face plate.

Referring now to FIGS. 12 and 13, FIG. 12 illustrates the close proximity of each plate section in the collapsed position as illustrated in FIG. 11A. The collapsed position allows for easier storage of the face plate when not in use. FIG. 13 illustrates a modification of the plate sections of FIGS. 8–12 whereby the plate sections include a flange which is preferably curved. The curved flanges have differing radii to allow the plate section to be collapsed. Plate section 62D has the smallest radius and the radius progressively increases for plate sections 62C, 62B and plate section 62A having the largest radius for the flange. It will be appreciated that different flange shapes and sizes can be used.

The invention has been described with reference to preferred embodiments, it will be appreciated that modifications or alterations which would not deviate from the present invention will occur to others upon the reading and understanding of the specification. It is intended that all such modifications or alterations be included insofar as they come within the scope of the invention as claimed or the equivalence thereof.

I claim:

1. A vehicle security device adapted to limit access to a steering wheel which steering wheel includes a rim having a given diameter and a front face, a back face and radially inner and outer edges, said device comprising a substantially circular protective face plate formed of a cut resistant material and having a central axis and lying in a plate plane and an outwardly extending peripheral edge having a diameter adapted to at least cover the radial inner edge of said rim, said face plate divided into at least two plate sections and including means for connecting together said plate sections, each of said plate sections having an outer edge and including at least one opening positioned inwardly from said outer edge, said means for connecting including pivot means located substantially about said face plate central axis and guide means for limiting the position of said plate sections with respect to one another about said face plate central axis, each of said plate sections connected to said pivot means for movement between at least two positions about said central axis and plate plane of said face plate whereby said first position is a collapsed position and said second position is an open position.

2. A device as defined in claim 1, wherein said pivot means is a rivet.

3. A device as defined in claim 1, wherein each of said plate sections has substantially similar dimensions.

4. A device as defined in claim 1, wherein said plate sections form said substantially circular face plate by rotating each of said plate sections about said pivot means from said first position to said second position until each of said plate sections are symmetrically oriented about said central axis of said face plate.

5. A device as defined in claim 1, wherein said guide means maintains said plate sections substantially symmetrically oriented in said second position.

6. A device as defined in claim 3, wherein said plate sections form said substantially circular face plate by rotating each of said plate sections about said pivot means from said first position to said second position until each of said plate sections is symmetrically oriented about said central axis of said face plate.

7. A device as defined in claim 1, wherein each of said openings is positioned essentially diametrically opposite from each other in said second position.

8. A device as defined in claim 7, wherein two of said openings on two adjacent plate sections overlap in said second position.

9. A device as defined in claim 4, wherein each of said openings is positioned essentially diametrically opposite from each other in said second position.

10. A device as defined in claim 1, wherein two of said openings on two adjacent plate sections overlap in said second position.

11. A device as defined in claim 9, wherein two of said openings on two adjacent plate sections overlap in said second position.

12. A device as defined in claim 1, wherein said guide means includes a generally curvilinear slot concentrically positioned on said plate section relative to said central axis of said face plate.

13. A device as defined in claim 12, wherein said guide means including coupling means for orienting at least two plate sections about said central axis of said face plate and relative to said curvilinear slot.

14. A device as defined in claim 13, wherein said coupling means is a rivet.

15. A device as defined in claim 12, wherein said face plate includes three plate sections and two of said plate sections include said curvilinear slot.

16. A device as defined in claim 12, wherein said face plate includes four plate sections and three of said plate sections include said curvilinear slot.

17. A device as defined in claim 1, including lock means for attaching said face plate to said steering wheel.

18. A device as defined in claim 17, wherein said lock means includes means adapted to extend through each of said openings and about the inner edge of said steering wheel.

19. A device as defined in claim 18, wherein said means extending through includes two hooks positioned substantially diametrically apart.

20. A device as defined in claim 1, wherein at least one of said openings is substantially oblong in shape.

21. A device as defined in claim 1, wherein said face plate includes a flange attached to the peripheral edge of said face plate and extending outward from said peripheral edge of said face plate.

22. A device as defined in claim 21, wherein said flange is substantially cylindrical.

23. A device as defined in claim 21, wherein said flange is attached to substantially the entire peripheral edge of said face plate.

24. A device as defined in claim 22, wherein said Range is attached to substantially the entire peripheral edge of said face plate.

25. A device as defined in claim 1, wherein said face plate includes reinforcement means for rigidifying said face plate.

26. A device as defined in claim 25, wherein said reinforcement means includes at least one corrugation in at least one of said plate sections.

27. A device as defined in claim 1, including means for limiting rotation of said steering wheel.

28. A device as defined in claim 17, including means for limiting rotation of said steering wheel.

29. A device as defined in claim 27, wherein said means for limiting rotation extends radially outwardly from the edge of said face plate.

30. A device as defined in claim 28, wherein said means for limiting rotation is connected to said means for attaching.

31. A device as defined in claim 30, wherein said means for limiting rotation extends radially outwardly from said outer edge of steering wheel.

32. A device as defined in claim 1, wherein said opening is positioned at least 0.25 inch from said outer edge.

33. A device as defined in claim 1, wherein said cut resistant material is a metallic material.

34. A device as defined in claim 1, wherein said guide means engages at least two adjacently positioned plate sections.

35. A device as defined in claim 6, wherein said guide means engages at least two adjacently positioned plate sections.

36. A vehicle security device adapted to limit access to a steering wheel, said device comprising a protective face plate formed of a cut resistant material, lying in a plate plane, and having an outwardly extending peripheral edge, said face plate divided into at least two plate sections, said plate sections including a connector to connect together said plate sections, each of said plate sections having an outer edge and including at least one opening positioned inwardly from said outer edge, said connector adapted for limiting rotation of each of said plate sections substantially within said plate plane, each of said plate sections including a guide mechanism to restrict the movement of each plate section with respect to one another, said plate sections movable between at least a first position and a second position whereby said first position is a collapsed position and said second position is an open position.

37. A device as defined in claim 36, wherein said opening of one of said plate sections overlaps said opening of another of said plate sections when said plate sections are moved into said open position.

38. A device as defined in claim 36, wherein said face plate includes at least three plate sections.

39. A device as defined in claim 36, wherein at least one plate section includes a flange.

40. A device as defined in claim 36, wherein said guide mechanism includes a guide passage and guide coupler.

41. A device as defined in claim 36, including a lock adapted to secure said face plate to said steering wheel.

42. A device as defined in claim 36, including an extension to limit rotation of said steering wheel.

43. A vehicle security device adapted to limit access to a steering wheel which steering wheel includes a rim having a front face, a back face and radially inner and outer edges, said device comprising a protective face plate formed from a cut resistant material, said face plate including an outwardly extending peripheral edge adapted to at least cover the radial inner edge of said rim, said face plate divided into at least two plate sections, said plate sections including a connector adapted to connect together said plate sections, said connector adapted to limit rotation of each of said plate sections substantially within a plate plane, each of said plate sections having an outer edge and including at least one opening positioned inwardly from said outer edge, each of said plate sections including a guide mechanism adapted to restrict the movement of each plate section between at least a first and second position whereby said first position is a collapsed position and said second position is an open position, said guide mechanism engaging at least two adjacently positioned plate sections and orienting said plate sections with respect to one another about said plate plane.

44. A device as defined in claim 43, wherein said guide mechanism includes a guide pin and a guide slot, said guide pin mounted on at least one of said plate sections and slidably connected into said guide slot of another one of said plate sections.

45. A device as defined in claim 43, wherein said opening of one of said plate sections overlaps said opening of another of said plate sections when said plate sections are moved into said open position.

46. A device as defined in claim 43, wherein said face plate includes at least three plate sections.

47. A device as defined in claim 43, wherein at least one plate section includes a flange.

48. A device as defined in claim 43, including a lock adapted to secure said face plate to said steering wheel.

49. A device as defined in claim 43, including an extension to limit rotation of said steering wheel.

\* \* \* \* \*